Nov. 28, 1967 J. F. ALEXANDER ET AL 3,355,549

UNIVERSAL REPEATER

Filed Nov. 27, 1963 2 Sheets-Sheet 1

INVENTORS
JACK F. ALEXANDER
PAUL E. MORRIS
BY Bernard Olcott
ATTORNEY

INVENTORS:
JACK F. ALEXANDER
PAUL E. MORRIS
BY Bernard Olcott
ATTORNEY

United States Patent Office 3,355,549
Patented Nov. 28, 1967

3,355,549
UNIVERSAL REPEATER
Jack F. Alexander and Paul E. Morris, Sanford, Fla., assignors to Ortronix, Inc., Orlando, Fla., a corporation of Florida
Filed Nov. 27, 1963, Ser. No. 326,514
17 Claims. (Cl. 178—70)

Figure 1:
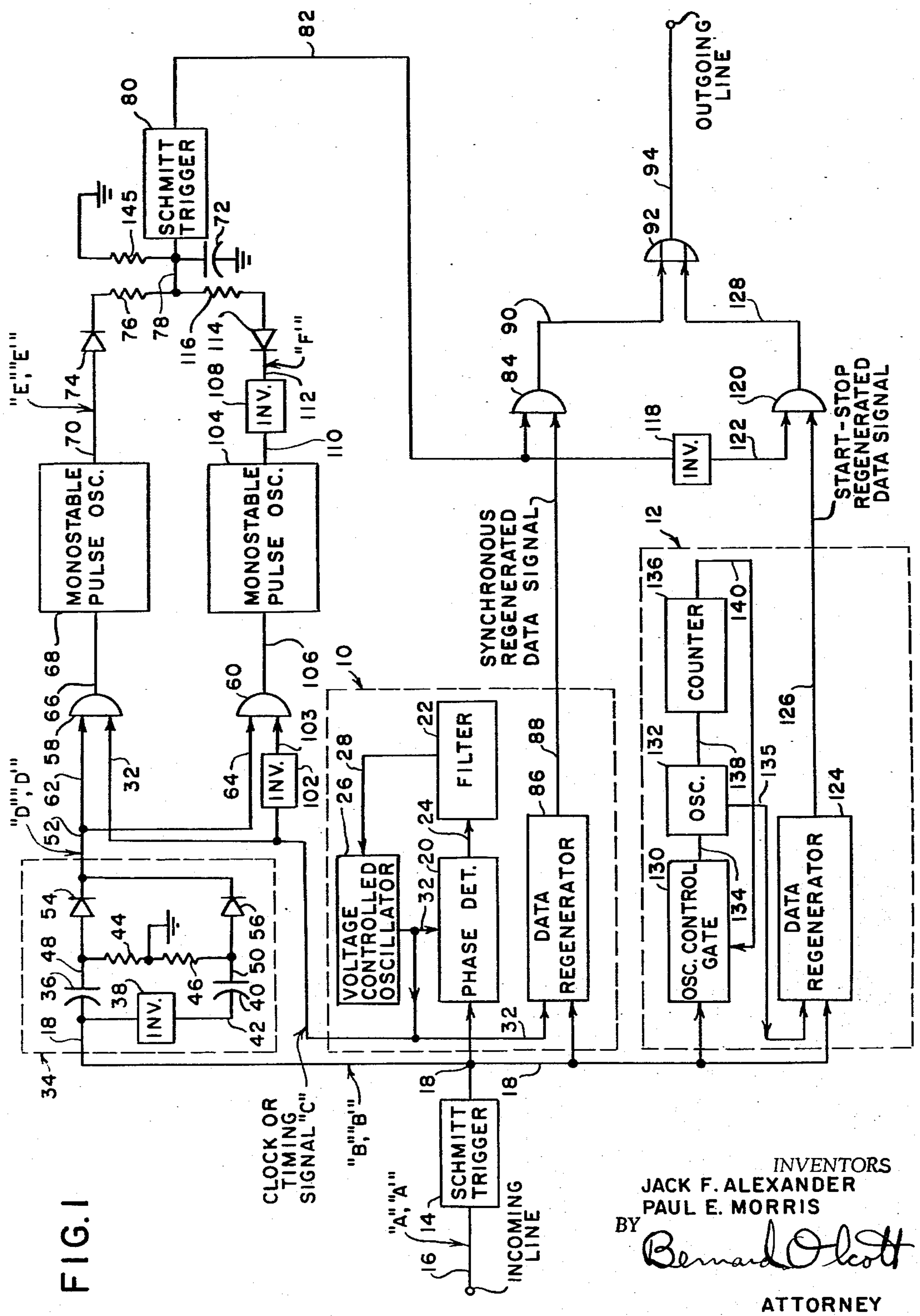

This invention relates to electronic repeating apparatus for communication channels or lines to increase the power level of signals and to improve the shape and remove noise from a series of pulses representing intelligence and in particular to an improved universal repeater which will automatically repeat coded signals of the "synchronous" type or the "baudot" type.

Separate repeaters are known in the prior art for processing either synchronous or baudot data. If the type of incoming signal is known, it is then a simple matter to switch into the line a proper synchronous or baudot (start-stop) repeater at the beginning of the message. However, if the type of the incoming signal is unknown, considerable time is wasted and a part of the message lost while the operator is trying to decide whether the incoming signal is of one type or the other.

It is the object of the invention to provide a universal type of repeater which when placed on the line will automatically repeat incoming signals whether of the synchronous or baudot type.

It is also an object of the invention to provide a universal repeater which will automatically switch the incoming signal, when its type changes, to proper repeating equipment in a very short time so that no appreciable portion of the message is lost.

According to the invention there is provided a universal repeater for connection to an incoming line adapted to receive a series of informational pulses and to an outgoing line which comprises a synchronous repeater having a clock signal output and a synchronous repeating signal output; a baudot repeater having a baudot repeating signal output; means coupling the input sides of the synchronous repeater and the baudot repeater to the incoming line; an energy storage means; means coupled to the incoming line for providing an increment of energy to the energy storage means whenever a selected portion of each informational pulse coincides with a selected portion of the clock signal output of the synchronous repeater and to provide an opposite increment of energy to the energy storage means whenever a selected portion of each informational pulse does not coincide with a selected portion of the clock signal output; a first gate connected between the repeating signal output of the synchronous repeater and the outgoing line; a second gate connected between the repeating signal output of the baudot repeater and the outgoing line; and means responsive to the energy level in the energy storage means for opening one of the gates and closing the other gate.

Other objects and features of the present invention will be set forth or apparent in the following description and claims and illustrated in the accompanying drawings, which disclose by way of example, and not by way of limitation, in a limited number of embodiments, the principle of the invention and structural implementations of the inventive concept.

Figure 2:
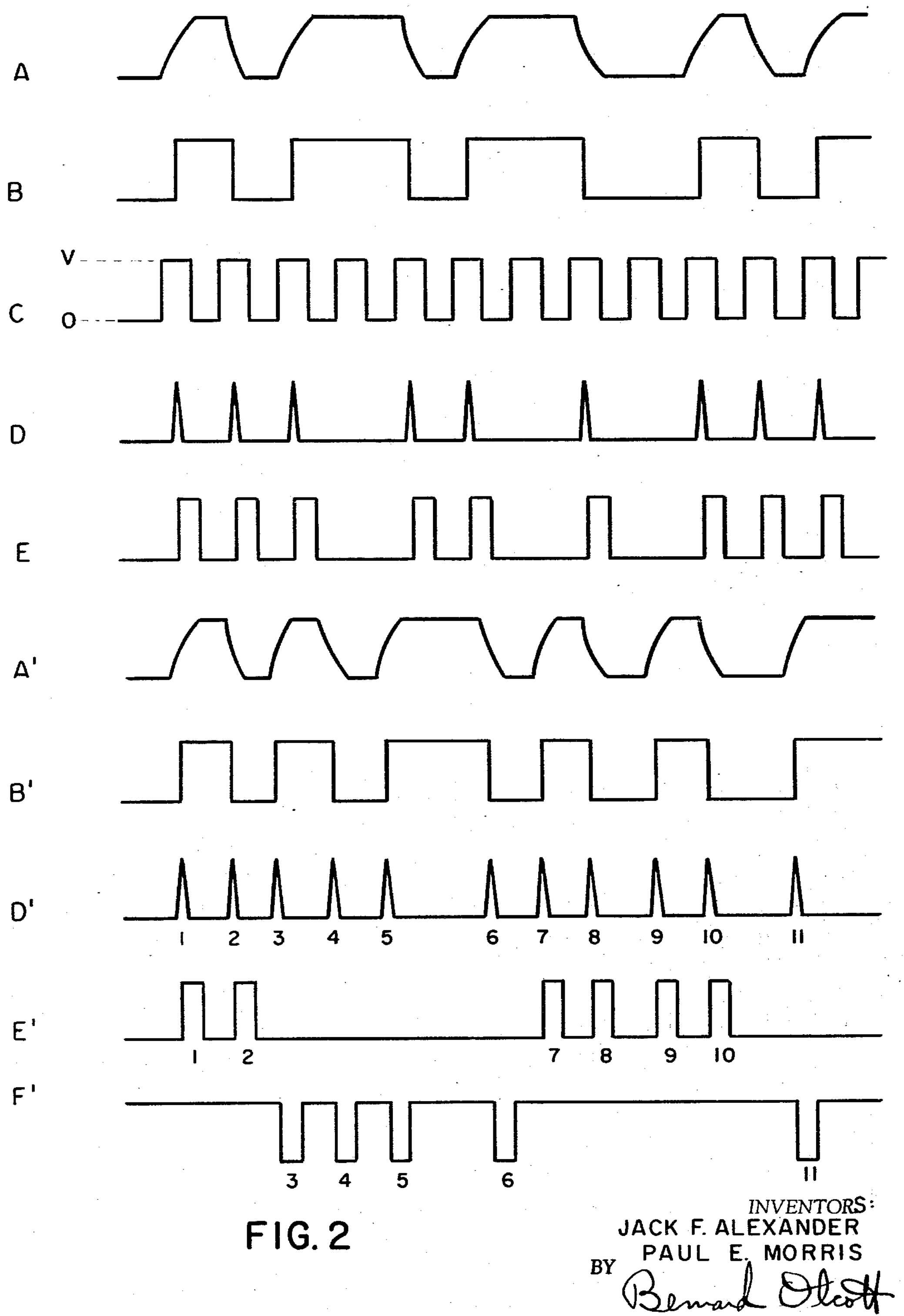

In the drawings, in which like reference numbers designate like components in the several views:

FIGURE 1 is a schematic diagram of a Universal Repeater according to the invention; and FIGURE 2 is a representation of the waveforms of the signals at selected locations of the schematic diagram of FIG. 1.

The Universal Repeater shown in FIG. 1 comprises a synchronous repeater 10, as for instance model SYN-4, Cat. CSB-5008, as manufactured by Stelma, Inc., Stamford, Conn., and, a start-stop (baudot) repeater 12, as for instance, type 207, model 1, Northern Radio Company, Inc., New York, N.Y., connected at their input sides to a Schmitt trigger circuit 14 to simultaneously receive a train of pulses having coded intelligence of either the "synchronous" or "baudot (start-stop)" type. As shown in FIGURE 2, a signal A on incoming line 16 to the Schmitt trigger 14 may either be of the synchrouous type shown as waveform A, or a waveform A' of a "baudot" (start-stop) type, each being considerably obliterated with noise (not shown).

Let us first assume that the input signal is "synchronous" as shown by waveform A. The Schmitt trigger 14 conditions the signal so that it appears as a square waveform B on lead 18 with a great reduction in noise content. The signal B is conducted to the input of synchronous repeater 10 and in particular to the one input side of a double input phase detector 20. A phase lock loop is formed in synchronous repeater 10 by connecting a filter 22 to the output side of the phase detector 20 by a lead 24 and connecting a voltage controlled oscillator 26 in controlled relationship to the output side of filter 22 by a lead 28. The phase lock loop is closed by a lead 32 from the output side of voltage controlled oscillator 26 to the other input of phase detector 20. When the phase loop is "locked" lead 32 provides a clock or timing signal C as shown in FIG. 2 which has twice the basic frequency of the incoming synchronous signal A but 90° out of phase therewith.

The signal B appearing on lead 18 is conducted to the input side of a spike generator 34. In spike generator 34, one side of a capacitor 36 and the input side of an inverter 38 is connected to lead 18. One side of another capacitor 40 is connected to the output of the inverter 38 by a lead 42. The other side of each of the capacitors 36 and 40 are connected to ground through resistors 44 and 46, respectively, by leads 48 and 50 respectively. Leads 48 and 50 are connected to a common lead 52 through diodes 54 and 56, the cathodes of both diodes being connected to the common lead 52. The output of the spike generator on lead 52 is shown as waveform D in FIG. 2 and comprises spikes at each of the rising and falling edges of the square waveform B. Spike generator 34 acts as a discriminator, the rising positive increasing wave fronts of signal B passing through capacitor 36 and diode 54 to lead 52. The voltage decreasing falling edges of waveform B being inverted by 38 appear as positive signals on lead 42 which pass through capacitor 40 and diode 56 to lead 52. For this reason, the spikes in waveform D are all of the same polarity.

The output of the spike generator 34 as it appears on lead 52 is conducted to one input of each of a double input AND gate 58 and 60 by leads 62 and 64, respectively. Gate 58, which we will hereinafter refer to as the "coincidence gate," has its other input connected to lead 32 which has the clock or timing signal C from the voltage controlled oscillator 26 of the synchronous repeater 10.

As shown in FIG. 2, each of the spikes on curve D occur during the center interval at voltage level V of signal C, the latter appearing as the clock or timing signal on lead 32. Accordingly, "concidence" AND gate 58 will pass all spikes of signal D to output lead 66.

A monostable pulse oscillator 68 forms a pulse having a selected energy content shown as waveform E in FIG. 2 for each of the spikes in waveform D. Pulses appearing on the output lead 70 of the oscillator 68 are conducted to one side of a capacitor 72 through a series connection of a diode 74 and a resistor 76 by a lead 78, the anode of the diode 74 being connected to oscillator 68. Accordingly, each pulse E initiated by each of the spikes D will incrementally charge capacitor 72. When the charge on capacitor 72 reaches a preselected threshold, a Schmitt trigger circuit 80 connected at its input side to capacitor 72 will provide a signal on output lead 82 which is connected to one input of a double input AND gate 84 for "opening" such gate with respect to its other input. Such other input is connected to the output side of a data regenerator 86 of synchronous repeater 10 by a lead 88. Data regenerator 86 has two inputs, one of which is connected to lead 32 and the other one which is connected to lead 18 for generating a new signal corresponding to waveform B but with higher signal power level and better signal to noise ratio. Such regenerated signal appears on output lead 88 which is conducted to lead 90 through gate 84, the latter having been "opened" by the changed signal on lead 82 when capacitor 72 becomes charged. Gate 92 is a double input OR gate which conducts the regenerated synchronous signals from lead 90 to the outgoing line 94.

Let us now assume that the incoming signal on line 16 are teletype signals of the "start-stop" type encoded in the baudot code as shown in waveform A′ in FIG. 2. Schmitt trigger 14 receives signal A′ and provides a signal B′ on lead 18 as an input to the synchronous repeater 10 and the spike generator 34. It will be assumed that the basic frequency rate of the signals of waveform A and A′ is the same as a simplification of the explanation of the theory of operation in connection with FIG. 2. Accordingly, in FIG. 2 the clock or timing signal C remains unchanged as the signal on lead 32 which is connected to one input of the "coincidence" gate 58 and one input of the gate 60, hereinafter referred to as the "error" gate, through an inverter 102 by lead 103. Spike generator 34 receives the reconditioned signal B′ and provides waveform D′ with spikes at each of the leading and falling edges of the square wave of the B′ signals.

The "coincidence" gate 58 compares the signals D′ and the waveform C for coincidence and will pass only those spikes of waveform D′ which occur when waveform C is at its V level. Accordingly, only the first, second, seventh, eighth, ninth, and tenth spike of C′ will be conducted by AND gate 58 to monostable pulse oscillator 68 to provide a charging series of pulses E′ for capacitor 72.

Inverter 102 shifts the waveform C 180° so that the "error" AND gate 60 will pass the third, fourth, fifth, sixth and eleventh spike of curve D′ to a monostable pulse oscillator 104 by a lead 106 connected to the output of gate 60. Pulse oscillator 104 is connected at its output side to an inverter 108 by a lead 110. The output of inverter 108 on lead 112 is represented as waveform F′ in FIG. 2. Waveform F′ provides a negative pulse for each spike of curve D′ which is out of coincidence with a pulse at the V level of waveform C. The negative pulses of waveform F′ are conducted through a diode 114 to discharge capacitor 72 through a resistor 116, diode 114 having its cathodes connected to lead 112.

Accordingly, capacitor 72 tends to be charged positively by waveform E′ and negatively by waveform F′ so that the net charge on capacitor 72 does not reach the preselected threshold to change the voltage level on lead 82. The unchanged voltage level on lead 82 keeps gate 84 "open" so that the output of the synchronous repeater 10 is prevented from reaching the output line 94.

An inverter 118 is connected between lead 82 and one input of a double input AND gate 120 by a lead 122. The other input of gate 120 is connected to the output side of data regenerator 124 of the start-stop baudot repeater 12 by a lead 126. When the signal on lead 82 "opens" the AND gate 84, the inverter 118 "closes" AND gate 120. Accordingly, the baudot series of teletype signals A′ on the input line 16 is regenerated by repeater 12 to provide signals of higher power level which duplicate the teletype baudot signals on line 16. Such repeated signals pass through the "closed" gate 120 to a lead 128 which is conducted to the outgoing line 94 through the OR gate 92.

As shown in FIG. 1, start-stop repeater 12 has a double input oscillator control gate 130, one input of which is connected to lead 18 for receiving B′. An oscillator 132 is connected at its input side to the output of gate 130 by a lead 134. One output of oscillator 132 is connected to one of the two inputs of data regenerator 124 by a lead 135. Another output of the oscillator 132 is connected to a counter 136 by a lead 138. The output of the counter is connected to the other input of gate 130 by a lead 140. The other input of the data regenerator 124 is connected to lead 18 for receiving B′ signals.

As explained hereinbefore, it was convenient in connection with explaining the theory of operation to assume that the basic frequency of the baudot signals is the same as the basic frequency of the synchronous signals so that only a single waveform C need be shown in FIG. 2. However, such two basic frequencies need not be the same. In such case, the clock or timing signal on lead 32 from synchronous repeater 10 will tend to assume the basic frequency of the baudot signals and will change from that as shown in FIG. 2. However, after the new clock signal is formed, "coincidence gating" will occur in AND gate 58 to produce a waveform corresponding to waveform E′. Also, at the same time, "error gating" will occur in gate 60 to provide an opposite polarity signal F′ on lead 112 which corresponds to the waveform shown in FIG. 2. As a result, capacitor 72 can not be charged to the pre-selected threshold for triggering the Schmitt circuit 80 to close gate 84.

Both the repeaters 10 and 12 may have their inputs connected together as in FIG. 1 so that they are both, at all times, attempting to process or "digest" the incoming signal. In such case, none of the component circuits are switched off but remain energized for instantaneous use and without "warm-up." However, it is to be understood that the start-stop regenerator 12 may optionally be de-energized by the signal on lead 122 which opens gate 120 (via a circuit not shown in FIG. 1) to eliminate any local noise generation by oscillator 132. In such alternate arrangement, solid state components for repeater 12 will normally be employed to avoid frequency drift problems during intermittent operations.

It will be noted that the clock signal C remains running without appreciable change in frequency during the "stop" portion of the baudot cycle. Also, that when either one of gates 84 or 120 is "open," the other gate is "closed." Accordingly, at all times, one and only one of the repeaters 10 or 12 is connected to the outgoing line in dependence upon whether the incoming signals are synchronous or baudot.

It will also be noted that the start-stop repeater 12 is always connected to the outgoing line so long as capacitor 72 remain uncharged, or charged below the selected threshold value, and that the output of synchronous repeater 10 is quickly switched to the outgoing line when a predetermined small number of "coincidence" pulses reach the two inputs of gate 58. Accordingly, only a small number of the front pulses of a synchronous coded group of pulses can be lost before the synchronous repeater is connected to the outgoing line 94. A bleed resistor 145 may optionally be connected across capacitor 72 so that the universal repeater may more rapidly respond to start-stop signals directly following synchronous signals. It is also to be understood that the Schmitt trigger circuit 80 can be adjusted for the other alternative so that synchronous repeater 10 (instead of repeater 12) will normally "float" on the outgoing line 94.

Additionally it is to be observed that "coincidence sampling" is effected at the center of the C pulses as a consequence of waveform C having twice the frequency A (or B) and being 90° phase displaced therefrom. Such "coincidence sampling" is advantageous since least likelihood is thereby provided for omitting an informational pulse which is heavily obliterated by noise.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

What we claim is:

1. A universal repeater for connection to an incoming line adapted to receive a series of informational pulses and to an outgoing line which comprises a synchronous repeater having a clock signal output and a synchronous repeating signal output; a baudot repeater having a baudot repeating signal output; first means coupling the input sides of said synchronous repeater and said baudot repeater to said incoming line; an energy storage means; second means coupled to said incoming line for providing an increment of energy to said energy storage means whenever a selected portion of each informational pulse coincides with a selected portion of the clock signal output of said synchronous repeater and to provide an opposite increment of energy to said energy storage means whenever a selected portion of each informational pulse does not coincide with a selected portion of said clock signal output; a first gate connected between the repeating signal output of said synchronous repeater and said outgoing line; a second gate connected between the repeating signal output of said baudot repeater and said outgoing line; and third means responsive to the energy level in said energy storage means for opening one of said gates and closing the other gate.

2. A universal repeater according to claim 1 wherein said first means includes a Schmitt circuit means coupled at its input side to said incoming line and at its output side to the input of the synchronous repeater and the baudot repeater.

3. A universal repeater according to claim 2 wherein said second means includes a discriminator coupled at its input side to the output side of said Schmitt circuit means for providing a unipolarity spike signal output at each change in output of said Schmitt circuit means; and a third gate having a first input coupled to the output side of said discriminator and a second input coupled to the clock signal output of said synchronous repeater for passing signals coinciding on both inputs, said clock output having twice the frequency of and being 90° phase displaced from the output of said Schmitt circuit.

4. A universal repeater according to claim 3 wherein said second means includes a first inverter; a fourth gate having a first input connected to the first input of said third gate and a second input coupled through said first inverter to the second input of said third gate for passing signals coinciding on both inputs, the output of said third gate being coupled to said energy storage means; and a second inverter, the output of said fourth gate being coupled through said second inverter to said energy storage means.

5. A universal repeater according to claim 4 wherein said second means includes a first diode connected in the circuit between the output side of said third gate and said energy storage means and a second diode connected in the circuit between the output side of said second inverter and said energy storage means, said first and second diodes being oppositely poled with respect to said energy storage means.

6. A universal repeater according to claim 5 wherein said second means includes a first monostable pulse oscillator coupled betwen the output side of said third gate and said energy storage means and a second monostable pulse oscillator coupled between the output of said fourth gate and said energy storage means.

7. A universal repeater according to claim 6 wherein said energy storage means is a capacitor.

8. A universal repeater according to claim 7 wherein said third means includes a potential level detector circuit means coupled at its input side to said capacitor.

9. A universal repeater according to claim 8 wherein said third means includes a second inverter and wherein said first and second gates are AND gates each having first and second inputs, said potential level detector being connected to the first input of said first gate and coupled through said second inverter to the first input of said second gate, said second input of said first gate being coupled to said synchronous repeater at its output side, said second input of said second gate being coupled to said baudot repeater at its output side.

10. A universal repeater for connection to an incoming line adapted to receive a series of informational pulses and to an outgoing line for repeating said series of informational pulses which comprises a Schmitt circuit means coupled at its input side to said incoming line and having a square wave output between two levels; a synchronous repeater and a baudot repeater both coupled at their input sides to the output of said Schmitt circuit means, said synchronous repeater having a square wave clock signal output of twice the frequency and being 90° phase displaced relative to the square wave output of said Schmitt circuit means; an energy storage means; first means providing an increment of energy of one polarity to said energy storage means whenever the instant of a level change of the output of said Schmitt circuit means occurs during the time interval of one output level of said clock signal output and providing an increment of energy of opposite polarity to said energy storage means whenever the instant of a level change of the output of said Schmitt circuit means occurs during the time interval of the other output level of said clock signal output; a first gate connected between the repeating signal output of said synchronous repeater and said outgoing line; a second gate connected between the repeating signal output of said baudot repeater and said outgoing line; and second means responsive to the energy level in said energy storage means for opening one of said gates and closing the other gate.

11. A universal repeater according to claim 10 wherein said first means includes a discriminator coupled at its input side to the output side of said Schmitt circuit means for providing a unipolarity spike signal output at each change in output of said Schmitt circuit means; and a third gate having a first input coupled to the output side of said discriminator and a second input coupled to the clock signal output of said synchronous repeater for passing signals coinciding on both inputs.

12. A universal repeater according to claim 11 wherein said first means includes a first inverter; a fourth gate having a first input connected to the first input of said third gate and a second input coupled through said first inverter to the second input of said third gate for passing signals coinciding on both inputs, the output of said third gate being coupled to said energy storage means; and a second inverter, the output of said fourth gate being coupled through said second inverter to said energy storage means.

13. A universal repeater according to claim 12 wherein said first means includes a first diode connected in the circuit between the output side of said third gate and said energy storage means and a second diode connected in the circuit between the output side of said second inverter and said energy storage means, said first and second diodes being oppositely poled with respect to said energy storage means.

14. A universal repeater according to claim 13 wherein said first means includes a first monostable pulse oscillator coupled between the output side of said third gate and said energy storage means and a second monostable pulse oscillator coupled between the output of said fourth gate and said energy storage means.

15. A universal repeater according to claim 14 wherein said energy storage means is a capacitor.

16. A universal repeater according to claim 15 wherein said second means includes a potential level detector circuit means coupled at its input side to said capacitor.

17. A universal repeater according to claim 16 wherein said second means includes a second inverter and wherein said first and second gates are AND gates each having first and second inputs, said potential level detector being connected to the first input of said first gate and coupled through said second inverter to the first input of said second gate, said second input of said first gate being coupled to said synchronous repeater at its output side, said second input of said second gate being coupled to said baudot repeater at its output side.

No references cited.

NEIL C. READ, *Primary Examiner.*

T. A. ROBINSON, *Assistant Examiner.*